United States Patent
Werner et al.

(10) Patent No.: US 7,539,132 B2
(45) Date of Patent: May 26, 2009

(54) METHODS, SYSTEMS, AND DEVICES FOR DETERMINING COS LEVEL

(75) Inventors: Carl E. Werner, Holmdel, NJ (US); Frank L. Rauscher, New Tripoli, PA (US)

(73) Assignee: AT&T Intellectual Property II, L.P., Bedminster, NJ (US)

( * ) Notice: Subject to any disclaimer, the term of this patent is extended or adjusted under 35 U.S.C. 154(b) by 491 days.

(21) Appl. No.: 11/040,214

(22) Filed: Jan. 21, 2005

(65) Prior Publication Data

US 2006/0164978 A1 Jul. 27, 2006

(51) Int. Cl.
*G01R 31/08* (2006.01)
(52) U.S. Cl. ...................................................... 370/229
(58) Field of Classification Search ............ 370/395.21, 370/395.43, 230.1, 238, 241, 252, 254; 379/120, 379/243; 455/452.2, 403; 707/103, 104.1; 709/203

See application file for complete search history.

(56) References Cited

U.S. PATENT DOCUMENTS

| | | | |
|---|---|---|---|
| 6,681,232 B1* | 1/2004 | Sistanizadeh et al. .... | 707/104.1 |
| 6,816,456 B1* | 11/2004 | Tse-Au ................... | 370/230.01 |
| 2001/0032262 A1* | 10/2001 | Sundqvist et al. ........... | 709/226 |
| 2002/0107908 A1* | 8/2002 | Dharanikota ................ | 709/203 |
| 2003/0092421 A1* | 5/2003 | Dolwin ........................ | 455/403 |
| 2005/0018611 A1* | 1/2005 | Chan et al. ................... | 370/241 |
| 2006/0007863 A1* | 1/2006 | Naghian ..................... | 370/238 |

OTHER PUBLICATIONS

Roughan, "Class-of-Service Mapping for QoS: A statistical signature-base approach to IP traffic classification", Jun. 10, 2004, 14 page(s), ACM SIGCOMM, US.

* cited by examiner

*Primary Examiner*—Chirag G Shah
*Assistant Examiner*—Yong Zhou
(74) *Attorney, Agent, or Firm*—Michael Haynes PLC; Michael N. Haynes

(57) ABSTRACT

Certain exemplary embodiments comprise a method comprising a plurality of activities, comprising: based on an analysis of historical information regarding packet traffic conveyed on a local area network associated with a customer, the packet traffic also conveyed on a wide area network managed by a service provider and coupled to the local area network: receiving information relating to a requested change in capacity provisioned for packet traffic conveyed on the wide area network; and automatically changing the capacity provisioned for packet traffic conveyed on the wide area network.

20 Claims, 3 Drawing Sheets

METHODS, SYSTEMS, AND DEVICES FOR DETERMINING COS LEVEL

BACKGROUND

Class of Service (COS) is a form of priority queuing that provides a way of classifying and prioritizing packets based on application type (voice, video, file transfers, transaction processing), the type of user (CEO, secretary), and/or other settings. COS can be divided among several priority levels, such as, for example, COS1 through COS4. COS classifies packets by examining packet parameters or COS markings and places packets in queues of different priorities based on predefined criteria. Low-priority traffic, such as COS4, is "drop eligible," while high-priority traffic, such as COS1, gets the best available service.

Prior to provisioning and/or changing network services, it can be difficult for a potential and/or current network service provider to reasonably determine an appropriate COS for a given customer. Likewise, customers with large data networks are often unable to precisely articulate their aggregate traffic patterns.

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Figure 1:
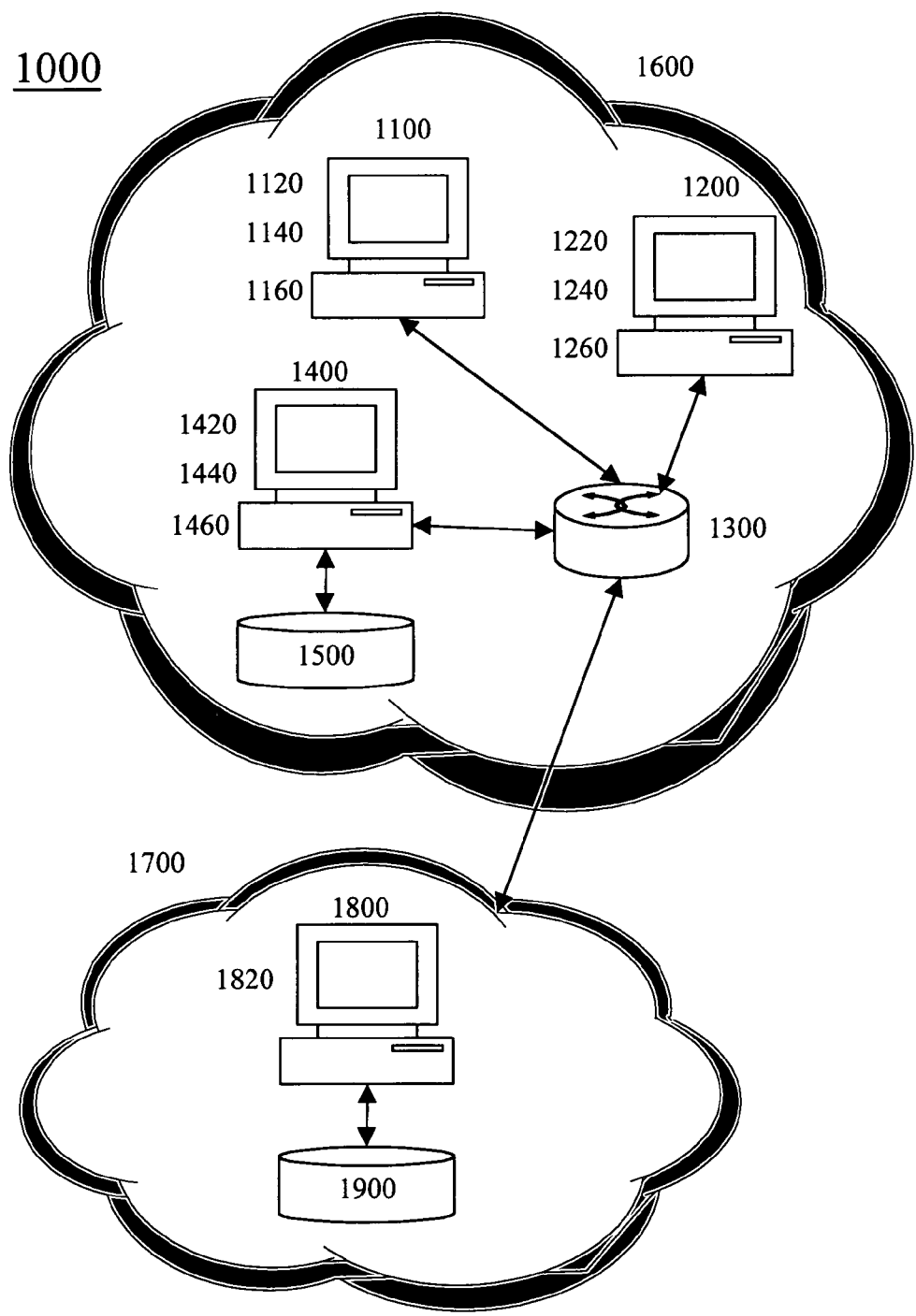
FIG. 1 is a block diagram of an exemplary embodiment of a system 1000.

Certain exemplary embodiments comprise a COS Determination & Provisioning Support System (CDPSS) which can be deployed on a customer LAN segment, which can be collocated with an on-premise Wide Area Network (WAN) access router and/or switch. CDPSS can be implemented on any type of information device that comprises a situation-appropriate processor, memory containing instructions (e.g., operating system, application specific programming, etc.), I/O, network interfaces, and/or a user interface, etc.

CDPSS can gather information regarding packets ingressing into and/or egressing from the customer's network and/or applications. Such information can include the types of packets, the applications associated with the packets, application port numbers, addresses, and/or packet quantity, flowrate, and/or changes therein, etc. The gathered information can be analyzed qualitatively and/or quantitatively, e.g., temporally, mathematically, and/or statistically, for any of several purposes, such as to determine the types of applications involved, an average flowrate for predetermined time intervals at various times of the day, etc. Based upon predetermined rules, the gathered and/or analyzed information can be classified, correlated, associated, and/or mapped to a COS priority level. This set of COS priority levels for each type of traffic class can then be automatically configured by CDPSS by marking the customer traffic before it enters the service provider's network.

CDPSS can comprise 1) automatic analysis and mapping of traffic to appropriate classes of service, and/or 2) dynamic correlation of traffic class settings and/or bandwidth to a service provider's network transport provisioning system. These features can enable traffic types to be prioritized on-demand without client or service provider intervention and/or ensure that proper capacity is measured to reserve appropriate bandwidth for all data classes.

CDPSS can comprise a configuration menu that can be utilized by the customer and/or service provider to modify the settings of CDPSS with the traffic classes offered by any service provider based on their specific implementation of the Differentiated Services Code Point (DSCP) traffic classification method. This feature can ensure end-to-end COS compatibility irregardless of the service provider selected by a customer. A bandwidth level for each COS priority level can be determined, such as via a predetermined factor applied to the application-aggregated peak bandwidth level for that COS priority level.

The resulting information can ensure that the customer orders and/or is automatically provided adequate bandwidth for each COS priority level, which can prevent dropped packets. For example, in the case of VoIP, adequate bandwidth can prevent phone calls from having clipped voices. CDPSS can ensure that COS markings are properly invoked as new applications are added to the customer environment or adjustments can be made dynamically as application utilizations change over time.

CDPSS can be implemented with various levels of alerts and/or asynchronous traps to provide notification and/or to respond when adequate bandwidth is not available to a certain traffic class based on pre-defined capacity rule sets. For example, in the event that a higher priority traffic class begins to consistently starve out the other classes, an alert and/or communication can be generated recommending and/or requesting an increase in bandwidth from the transport service provider which can be acted upon dynamically, on-demand, and/or in real-time by the service provider's provisioning system.

These dynamic adjustments can be performed via a community management path configured between the service provider's provisioning system and CDPSS to permit bidirectional communication between CDPSS and the network provisioning system. For example, the service provider can install a CDPSS Element Management System (EMS) in the form of software onto their provisioning system platform. To integrate this software with CDPSS, the Simple Network Management Protocol (SNMP) can be used to retrieve pre-defined elements from CDPSS associated with COS settings and/or bandwidth allocation. The modified COS settings and/or updated bandwidth subscriptions retrieved from CDPSS using SNMP can be in the form of a collection of CDPSS-specific Management Information Base or MIB elements. These MIB elements can be uploaded on the service provider's network provisioning system in order to interface with CDPSS.

Security between CDPSS and the service provider's provisioning system can be supported via explicit private community strings. These SNMP community strings can in turn serve as passwords and allow access to CDPSS MIB elements.

Service providers can utilize CDPSS for usage-based billing associated with COS utilization on an instant, hourly, daily, weekly, and/or monthly basis, etc. After the bandwidth required for each set of applications is determined, providing a choice of tiered COS traffic classification mapping profiles based on usage and cost might be desirable to the customer. Tiers starting with a less expensive level of COS would potentially provide the same traffic differentiation but with less desirable traffic characteristics as would be expected in the traditional quality versus cost tradeoff. For example, a customer might be offered the following three choices of COS pricing model tiers based on a need for 256 Kbps of bandwidth for a certain set of applications and 512 Kbps of bandwidth for another set of applications at a lower priority:

a. COS1=256 Kbps and COS2=512 Kbps, or
    b. COS2=256 Kbps and COS3=512 Kkbps, or
    c. COS3=256 Kbps and COS4=512 Kkbps Here, COS1 is the highest level of service, e.g., for voice over IP or video conferencing applications, with the level of service ending in COS4 which is best effort, e.g., email applications. This example would allow the customer a choice of three tiers of COS profiles to which to subscribe. Choice 1 would be the highest quality at the highest cost and Choice 3 would be the lowest quality with the lowest cost. These various levels of tiered pricing (and/or other tiered pricing schemes) could be available for selection through CDPSS at the time of initial configuration and/or on-demand, such that usage-based billing could be correlated to the customer's selected tier and/or COS subcription profile taking into account modifications to COS settings and/or bandwidth subscriptions due to changing traffic patterns throughout the billing interval. In other words, a customer can obtain and be charged for the precise WAN bandwidth and/or COS allocation desired at any point in time and/or for any desired time interval, consequently potentially enabling the optimized use and/or expense of WAN connectivity.

Thus, CDPSS can gather, analyze, and/or provide historical information from any past time period (e.g., the past month, the past few seconds, etc.) for network traffic ingressing and/or egressing a customer's LAN from/to a service provider's WAN. CDPSS can automatically provide information and/or a request to a network service provider's provisioning system sufficient to allow the network service provider's provisioning system to automatically and dynamically change the WAN bandwidth and/or COS subscription profiles provisioned for the customer on-demand and/or in real-time. Any projected, requested, and/or actual changes in provisioned WAN bandwidth and/or COS subscription profile can be communicated to the service provider's billing system and/or to the customer.

Thus, certain exemplary embodiments comprise a method comprising a plurality of activities, comprising: based on an analysis of historical information regarding packet traffic conveyed on a local area network associated with a customer, the packet traffic also conveyed on a wide area network managed by a service provider and coupled to the local area network: receiving information relating to a requested change in capacity provisioned for packet traffic conveyed on the wide area network; and automatically changing the capacity provisioned for packet traffic conveyed on the wide area network.

FIG. 1 is a block diagram of an exemplary embodiment of a system 1000, such as CDPSS, which can comprise a local area network (LAN) 1600 coupled to a wide area network (WAN) 1700 via a router 1300. LAN 1600 and/or WAN 1700 can be owned, operated, and/or managed by a customer and/or a WAN service provider.

Within LAN 1600, router 1300 can be coupled to other entities, such as information devices 1100, 1200, and/or 1400. Thus, packet traffic on LAN 1600, and particularly packet traffic destined to or from WAN 1700, can pass through router 1300. Information devices 1100, 1200 can comprise applications 1160, 1260 that provide a user interface 1140, 1240 to a user 1120, 1220 of that information device.

Via analyzer 1460, information device 1400 can monitor and/or inspect traffic flowing through router 1300, and particularly traffic traveling between LAN 1600 and WAN 1700. A user interface 1440 for analyzer 1460 can be provided to a user 1420 of information device 1400. Analyzer 1460 can comprise a packet sniffer and/or other packet inspection mechanism and/or an interface to the WAN service provider's provisioning system.

Based upon parameters specified by a user, customer, and/or WAN service provider, analyzer 1460 can automatically monitor, inspect, gather, analyze, store, report, render, and/or respond to information regarding packet traffic conveyed on LAN 1600, from LAN 1600 to WAN 1700, and/or from WAN 1700 to LAN 1600 (the latter two traffic types referred to herein as "LAN-WAN" traffic). Information device 1400 and/or analyzer 1460 can store, query, retrieve, relay, and/or report information, such as packet traffic information, via database 1500.

Analyzer 1460 can continuously and/or repeatedly analyze historical and/or real-time packet traffic information quantitatively and/or qualitatively. Analyzer 1460 can analyze historical and/or real-time packet traffic information temporally, mathematically, and/or statistically, etc. Analyzer 1460 can analyze packet traffic information for any one or more user-specified and/or predetermined frequency, duration, time period, and/or pattern (whether or not time-dependent), etc. Analyzer 1460 can analyze packet traffic information for any one or more user-specified and/or predetermined entity (such as a packet type, Class of Service level, Quality of Service level, time period, application type, application, information device type, information device, origin, destination, IP address, MAC address, user type, and/or user, etc.).

Analyzer 1460 can associate the packet traffic information with one or more WAN capacities, such as Class of Service levels, Class of Service profiles, Class of Service subscriptions, Quality of Service levels, and/or transport bandwidths, etc. Analyzer 1460 can provide one or more notifications when adequate capacity is not available on the WAN for at least a portion of the packet traffic, such as the packet traffic associated with a particular Class of Service level. When adequate capacity is not available on the WAN for at least a portion of the LAN-WAN packet traffic, analyzer 1460 can determine and/or request any one or more desired capacity (e.g., bandwidth and/or Class of Service level) and/or change in capacity.

Such a request can be received by a provisioning system 1820 of an information device 1800 residing on and/or within WAN 1700. Provisioning system 1820 can automatically receive and/or respond to capacity requests and/or capacity change requests by automatically provisioning changes in capacity on WAN 1700. Such changes in capacity can be provisioned and/or provided by, on, and/or within WAN 1700 automatically, continuously, dynamically, on-demand, and/or in real-time.

Thus, system 1000 and/or WAN 1700 can promptly and properly determine, recognize, respond to, provision, provide, account for, and/or bill, etc., changes in WAN capacity for any portion of LAN-WAN traffic on an as-needed basis, thereby automatically and/or continuously optimizing WAN capacity, costs, and/or charges for that traffic. This optimization can be provided for any entity associated with the LAN-WAN traffic.

Figure 2:
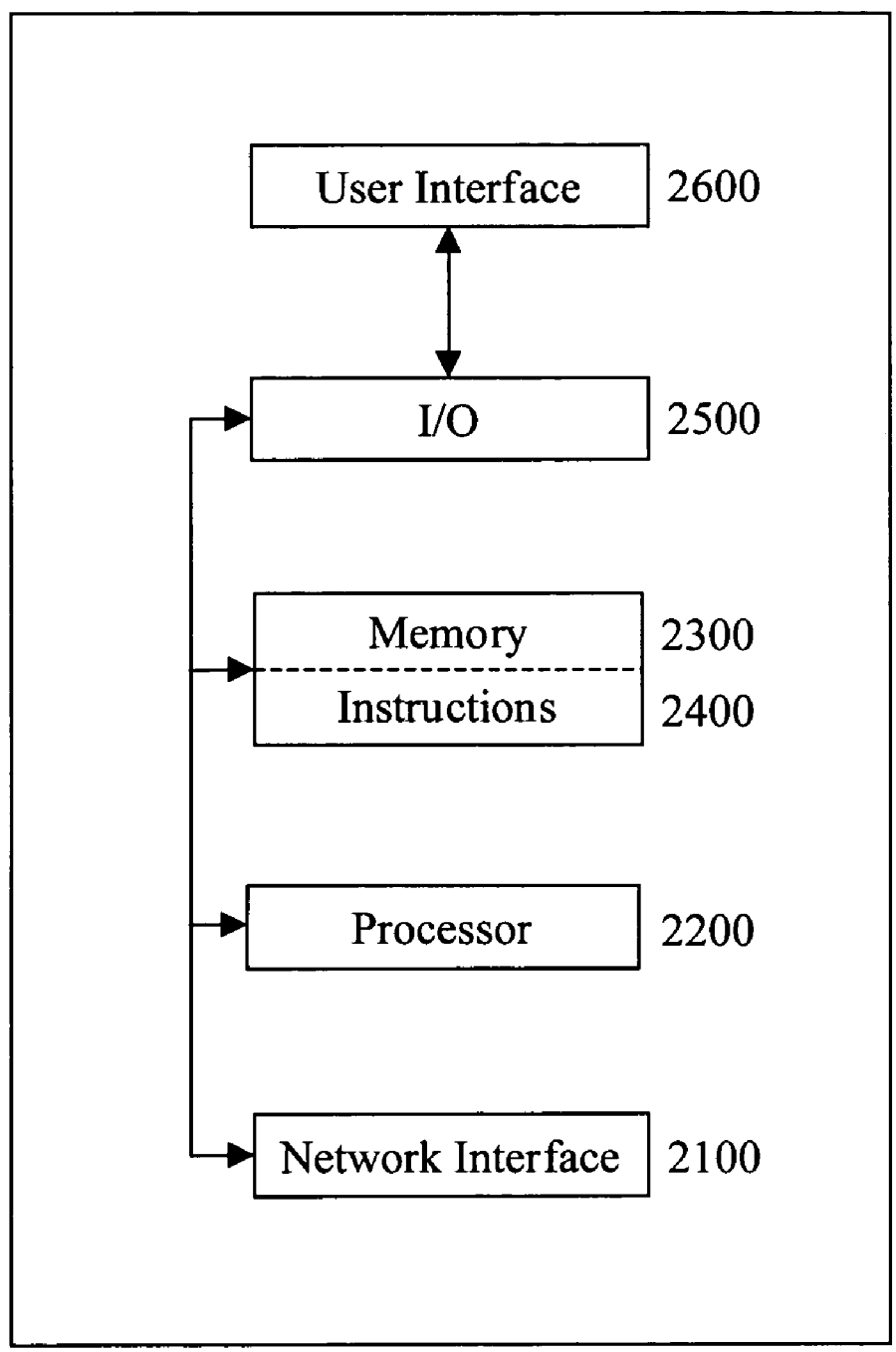
FIG. 2 is a block diagram of an exemplary embodiment of an information device 2000.

FIG. 2 is a block diagram of an exemplary embodiment of an information device 2000, which in certain operative embodiments can comprise, for example, server customer information device 1100, router 1300, 1700, 1800, 1900, and/or server 1400, etc. of FIG. 1. Information device 2000 can comprise any of numerous well-known components, such as for example, one or more network interfaces 2100, one or more processors 2200, one or more memories 2300 containing instructions 2400, one or more input/output (I/O) devices 2500, and/or one or more user interfaces 2600 coupled to I/O device 2500, etc.

In certain exemplary embodiments, via one or more user interfaces 2600, such as a graphical user interface, a user can view a rendering of, and/or information related to, historical packet traffic, etc. For example, a user can view a notification indicating that certain LAN-WAN traffic is trending toward requiring and/or predicted to require a change in WAN capacity to avoid packet loss, excess latency, jitter, delay, errors, and/or sub-optimal flow, over-capacity, excess charges, etc.

Figure 3:
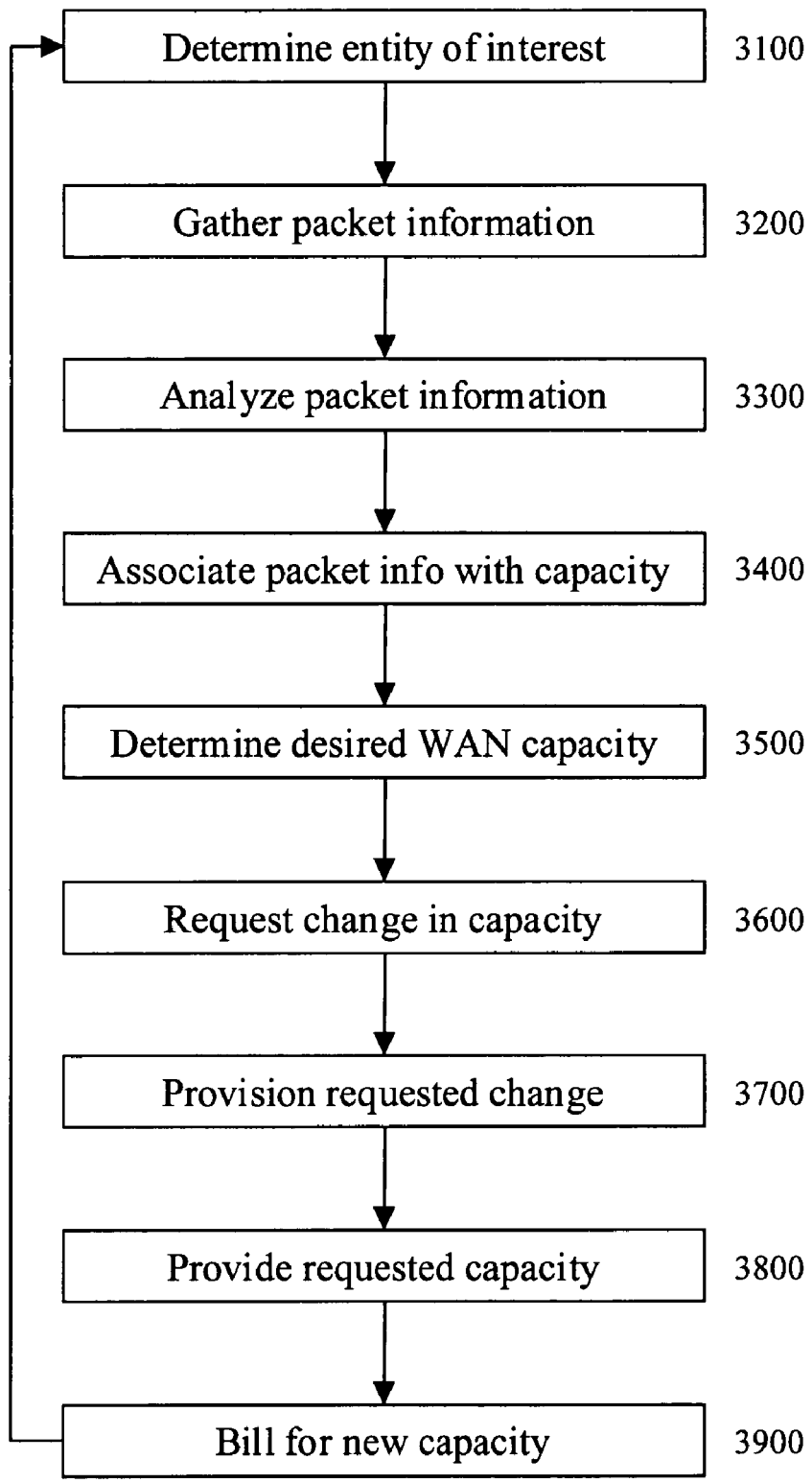
FIG. 3 is a flowchart of an exemplary embodiment of a method 3000.

FIG. 3 is a flowchart of an exemplary embodiment of a method 3000. At activity 3100, any one or more entity of interest can be determined and/or specified. For example, a user role such as nurse, air traffic controller, manager, etc. can be selected. At activity 3200, packet traffic information can be gathered and/or stored. For example, a quantitative measure of packet flow can be gathered for the specified entity. At activity 3300, the packet traffic information can be analyzed. For example, it can be determined that managers produce very little Voice over IP (VoIP) traffic between 11 PM and 6 AM on weekdays.

At activity 3400, the packet traffic information can be associated with a capacity measure, such as a bandwidth and/or a Class of Service level. For example, a current WAN capacity for the packet traffic can be determined. As another example, it can be determined that 512 Kbps are currently provided at all times for VoIP traffic for managers. At activity 3500, a desired capacity can be determined. For example, it can be determined that generally, only 128 Kbps of Class of Service Level 1 ("COS1") is needed as a baseline capacity for VoIP traffic for managers between 11 PM and 6 AM on weekdays, although that need could spike upwards at any time.

At activity 3600, a change in capacity can be requested. For example, a request can be provided and/or received to change the COS1 capacity for VoIP traffic for managers between 11 PM and 6 AM on weekdays. As another example, a request can be provided to increase the COS1 capacity for VoIP traffic for a particular manager to 512 kpbs until further notice. At activity 3700, the requested change in capacity can be provisioned. For example, additional logical channel bandwidth can be provisioned. As another example, a change in a Class of Service Profile can be provisioned. At activity 3800, the requested change in capacity can be provided. For example, WAN capacity can be continuously adjusted to reflect the real-time needs of an entity, such as a customer, user, origin, and/or application, etc. At activity 3900, the requested change in capacity can be billed. For example, the customer can be billed for the WAN capacity needed, requested, provisioned, and/or provided, etc.

When the following terms are used herein, the accompanying definitions apply:

adapted to—made suitable or fit for a specific use or situation.
analysis—the act, process and/or result of analyzing.
analyze—to examine methodically and/or in detail.
apparatus—an appliance or device for a particular purpose application—a computer program.
automatically—acting or operating in a manner essentially independent of external influence or control. For example, an automatic light switch can turn on upon "seeing" a person in its view, without the person manually operating the light switch.
can—is capable of, in at least some embodiments.
capacity—an available traffic flow capability and/or limit, such as a transport bandwidth, Class of Service subscriptions, Class of Service profile, Quality of Service subscription, etc.
change—(v.) to cause to be different; (n.) the act, process, and/or result of altering or modifying.
COS (Class of Service)—a form of priority queuing that provides a way of classifying and prioritizing packets based on application type (voice, video, file transfers, transaction processing), the type of user (CEO, secretary), and/or other settings. COS typically classifies packets by examining packet parameters or COS markings and placing packets in queues of different priorities based on predefined criteria. Typically, low-priority traffic is "drop eligible," while high-priority traffic gets the best available service.
Class of Service Profile—a listing of bandwidths allocated for various Classes of Service.
comprising—including but not limited to.
convey—to transmit, transport, and/or carry.
couple—to join, connect, and/or link together.
coupleable—capable of being joined, connected, and/or linked together.
customer—a user of data communication services.
data—distinct pieces of information, usually formatted in a special or predetermined way and/or organized to express concepts.
determine—to establish or ascertain definitely, such as after consideration, investigation, or calculation.
Differentiated Services Code Point—a traffic classification method which uses an enhancement to the IP precedence field in the header of an IP data packet.
entity—a person, team, role, organization, computer, application, and/or network with which packet traffic is associated.
gather—to collect, obtain, and/or receive.
historical—past.
in real-time—occurring immediately and/or with a delay of no more than about 1 second.
information—data.
instructions—directions adapted to perform a particular operation or function.
link—a channel for communication.
local area network—a data communications network that is geographically limited (typically to a 1 km radius).
machine-readable medium—a physical structure from which a machine, such as an information device, computer, microprocessor, and/or controller, etc., can obtain and/or store data, information, and/or instructions.
manage—to direct or control the use of.
may—is allowed to, in at least some embodiments.
memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.
network—a communicatively coupled plurality of nodes.
network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

on-demand—occurring in response to a request.

packet—a short block of data transmitted in a packet switching network.

periodically—occurring at regular and/or generally predictable intervals.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can be a central processing unit, a local controller, a remote controller, parallel controllers, and/or distributed controllers, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to make available; to supply; to prepare.

provision—(v.) to provide; (n.) the act, process, and/or result of providing; (n.) the thing provided.

receive—to take, obtain, and/or acquire.

render—to display, annunciate, speak, print, and/or otherwise make perceptible to a human.

render—to make perceptible to a human.

represent—to describe and/or symbolize.

request—(v.) to express a need and/or desire for; to inquire and/or ask for. (n.) that which communicates an expression of desire and/or that which is asked for.

server—an information device and/or software that provides some service for other information devices connected to it via a network. A common example is a file server, which has a local disk and services requests from remote clients to read and write files on that disk. A server can also provide access to resources, such as programs, shared devices, etc.

service provider—a provider of data communication services.

set—a related plurality.

specify—to indicate and/or state explicitly and/or in detail.

store—to enter and/or copy into and/or onto a machine-readable medium.

substantially—to a great extent or degree.

system—a collection of mechanisms, devices, data, and/or instructions, the collection designed to perform one or more specific functions.

traffic—a conveyance of messages or data through a system of communication and/or the messages or data conveyed through such a system.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

wide area network—a data communications network that spans a wider radius and/or area than does a local area network.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, U.S. patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising a plurality of activities, comprising:
   repeatedly and automatically:
   analyzing historical information regarding packet traffic conveyed on a local area network associated with a customer, the packet traffic associated with a predetermined entity and also conveyed on a wide area network managed by a service provider and coupled to the local area network;
   requesting from the service provider an on-demand change in capacity provisioned for packet traffic conveyed on the wide area network, the packet traffic marked to indicate a priority level from a predetermined set of priority levels before the packet traffic enters the wide area network; and
   via a Class Of Service Determination & Provisioning Support System, automatically changing a capacity for at least a portion of the packet traffic conveyed on the wide area network security between the Class Of Service Determination & Provisioning Support System and a provisioning system of a service provider supported via explicit Simple Network Management Protocol community strings.

2. The method of claim 1, further comprising:
   specifying the entity associated with the packet traffic, the change in capacity responsive to a choice of provided tiered class of service mapping profiles made by the customer, the class of service mapping profiles based on usage and cost.

3. The method of claim 1, further comprising:
   specifying a type of packets comprised by the packet traffic.

4. The method of claim 1, further comprising:
   specifying an application associated with the packet traffic.

5. The method of claim 1, further comprising:
   gathering the historical information.

6. The method of claim 1, wherein:
   the historical information relates to a quantitative measurement of packets comprised by the packet traffic.

7. The method of claim 1, wherein:
   the historical information relates to a quantitative measurement of packets comprised by the packet traffic; and the historical information is classified to the priority level from the predetermined set of priority levels.

8. The method of claim 1, further comprising:
   associating at least a portion of the historical information with a Class of Service level.

9. The method of claim 1, further comprising:
   providing a notification when adequate capacity is not available on the wide area network for at least a portion of the packet traffic.

10. The method of claim 1, further comprising:
    determining a desired Class of Service profile for at least a portion of the packet traffic, the Class of Service profile determined responsive to a configuration menu provided to a customer, the configuration menu adapted to modify a Class Of Service Determination & Provisioning Support System based on a specific implementation of a Differentiated Services Code Point traffic classification method.

11. The method of claim 1, further comprising:
    determining a desired Class of Service level for at least a portion of the packet traffic.

12. The method of claim 1, further comprising:
    determining a desired bandwidth for the packet traffic.

13. The method of claim 1, further comprising:
    automatically and dynamically provisioning the requested change in capacity for packet traffic conveyed on the wide area network.

14. The method of claim 1, further comprising:
    automatically changing a Class of Service level for at least a portion of the packet traffic conveyed on the wide area network.

15. The method of claim 1, further comprising:
    automatically changing a Class of Service Profile for at least a portion of the packet traffic conveyed on the wide area network.

16. The method of claim 1, further comprising:
    changing a bandwidth for at least a portion of the packet traffic conveyed on the wide area network.

17. A machine-readable medium storing instructions for activities implemented by a processor comprising:
    repeatedly and automatically:
    analyzing historical information regarding packet traffic conveyed on a local area network associated with a customer, the packet traffic associated with a predetermined entity and also conveyed on a wide area network managed by a service provider and coupled to the local area network;
    requesting from the service provider an on-demand change in capacity provisioned for packet traffic conveyed on the wide area network, the packet traffic marked to indicate a priority level from a predetermined set of priority levels before the packet traffic enters the wide area network; and
    via a Class Of Service Determination & Provisioning Support System, automatically changing a capacity for at least a portion of the packet traffic conveyed on the wide area network, security between the Class Of Service Determination & Provisioning Support System and a provisioning system of a service provider supported via explicit Simple Network Management Protocol community strings.

18. A method comprising a plurality of activities, comprising:
    based on an analysis of historical information regarding packet traffic conveyed on a local area network associated with a customer, the packet traffic associated with a predetermined entity and also conveyed on a wide area network managed by a service provider and coupled to the local area network:

receiving information relating to a requested change in capacity provisioned for packet traffic conveyed on the wide area network; and via a Class Of Service Determination & Provisioning Support System, automatically changing the capacity provisioned for packet traffic conveyed on the wide area network, the packet traffic marked to indicate a priority level from a predetermined set of priority levels before the packet traffic enters the wide area network, security between the Class Of Service Determination & Provisioning Support System and a provisioning system of a service provider supported via explicit Simple Network Management Protocol community strings.

19. A machine-readable medium storing instructions for activities implemented by a processor comprising:

based on an analysis of historical information regarding packet traffic conveyed on a local area network associated with a customer, the packet traffic associated with a predetermined entity and also conveyed on a wide area network managed by a service provider and coupled to the local area network:

receiving information relating to a requested change in capacity provisioned for packet traffic conveyed on the wide area network; and via a Class Of Service Determination & Provisioning Support System, automatically changing the capacity provisioned for packet traffic conveyed on the wide area network, the packet traffic marked to indicate a priority level from a predetermined set of priority levels before the packet traffic enters the wide area network, security between the Class Of Service Determination & Provisioning Support System and a provisioning system of a service provider supported via explicit Simple Network Management Protocol community strings.

20. The method of claim 18, further comprising:

specifying the entity associated with the packet traffic, the change in capacity responsive to a choice of provided tiered class of service mapping profiles made by the customer, the class of service mapping profiles based on usage and cost.

* * * * *